Nov. 23, 1948.  W. W. SLOANE  2,454,484
SHAKER CONVEYER
Filed Oct. 4, 1945  6 Sheets-Sheet 1
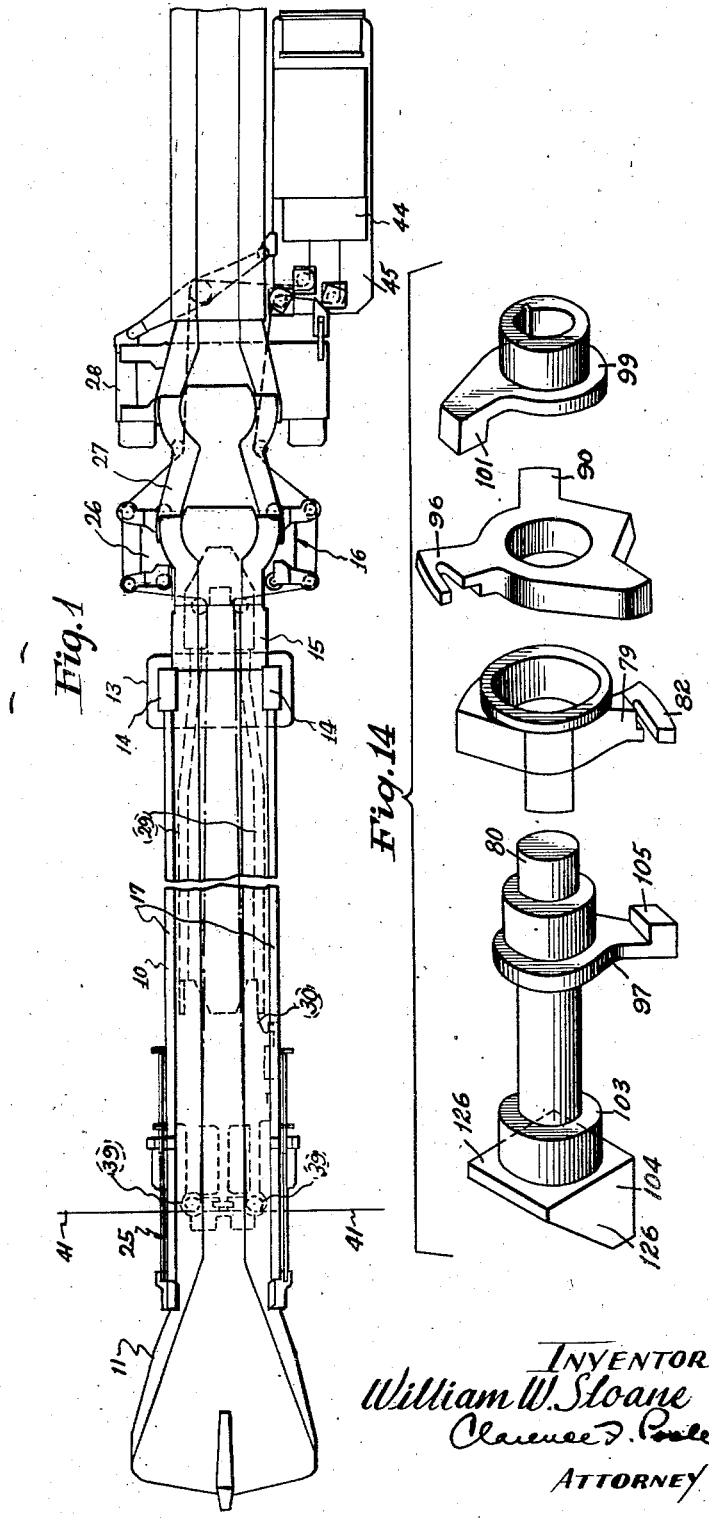
INVENTOR
William W. Sloane
Clarence T. Poole
ATTORNEY

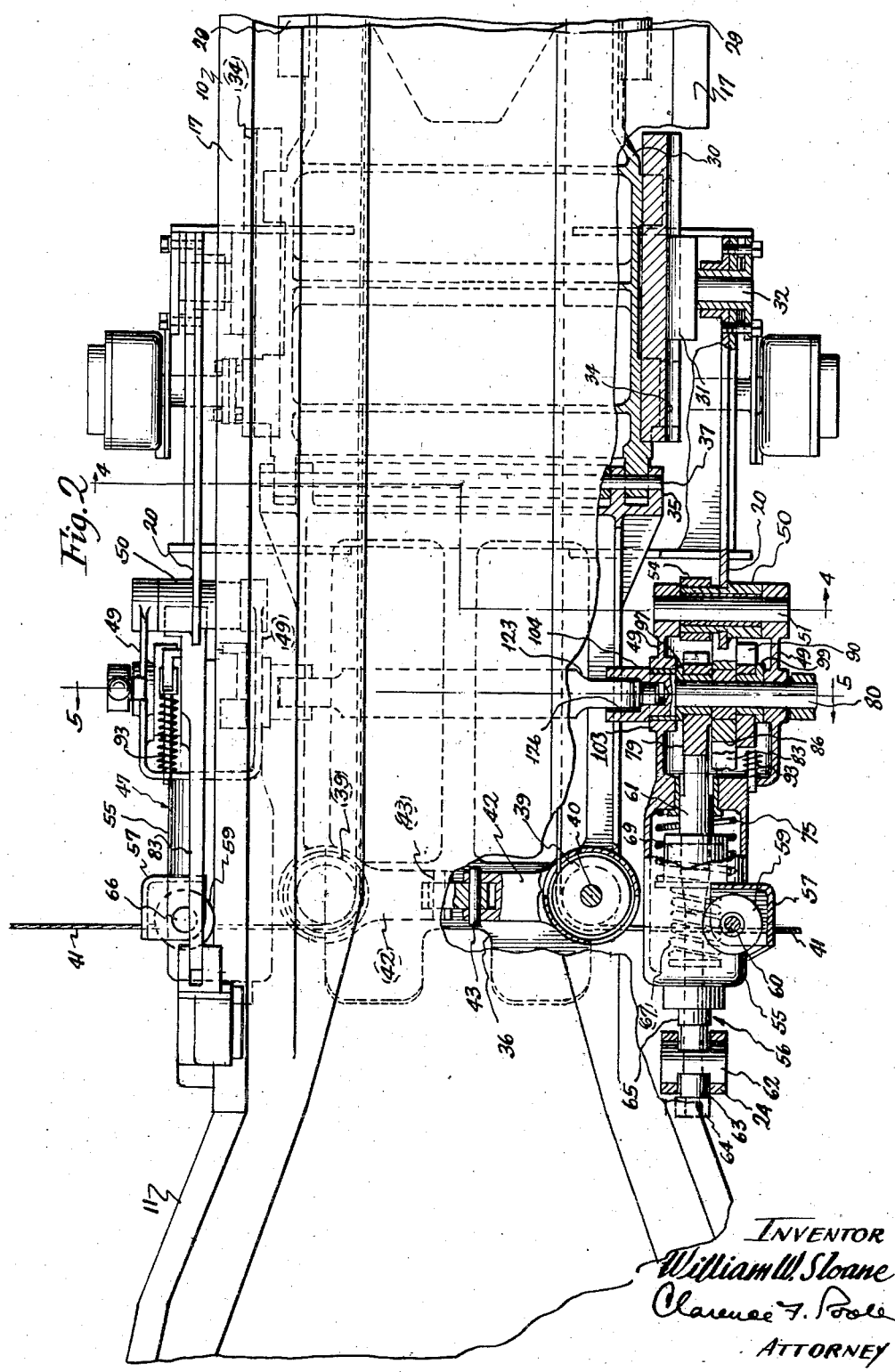

Nov. 23, 1948.  W. W. SLOANE  2,454,484
SHAKER CONVEYER
Filed Oct. 4, 1945  6 Sheets-Sheet 3
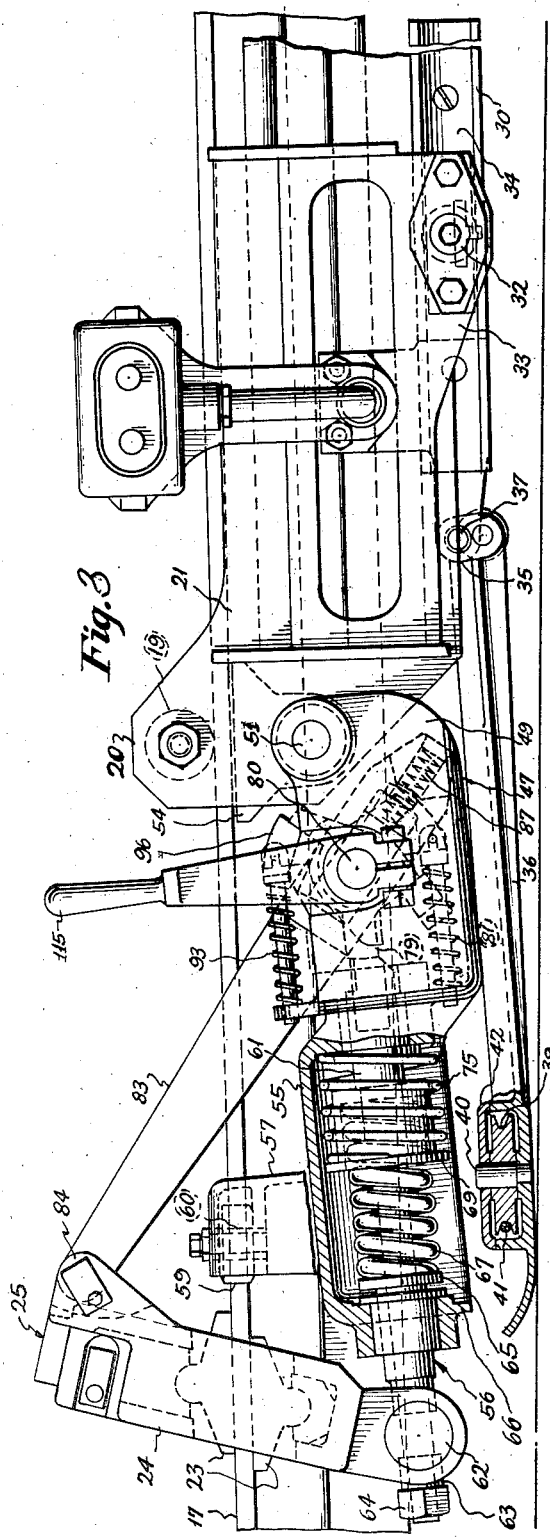
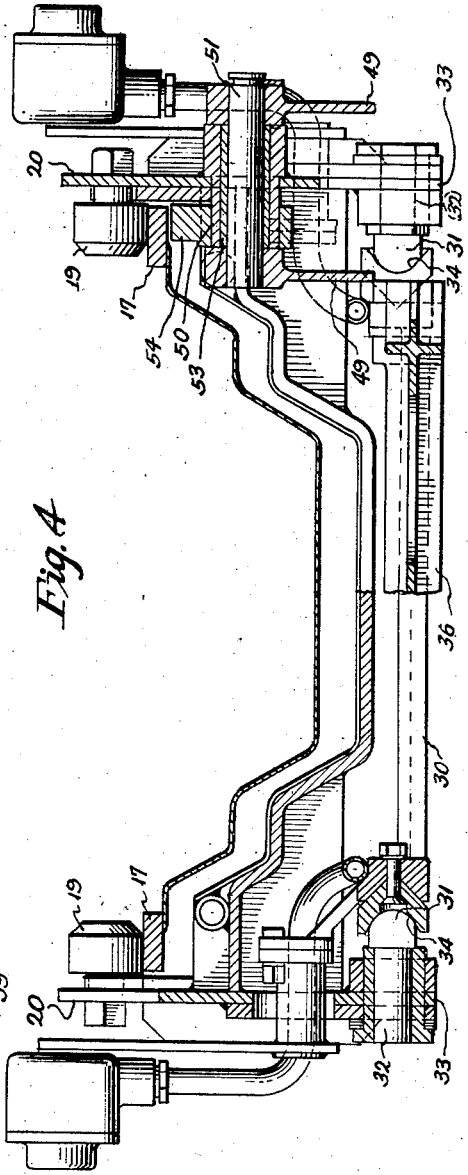
INVENTOR
William W. Sloane
Clarence F. Bell
ATTORNEY

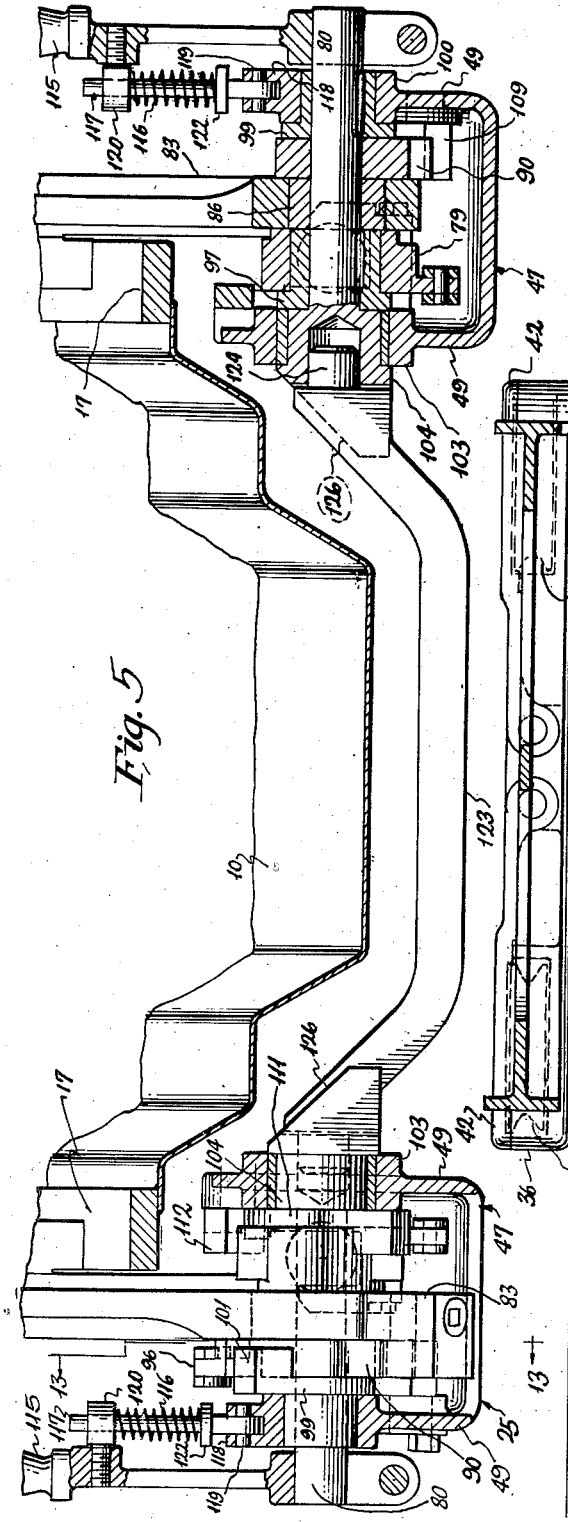

Nov. 23, 1948.　　　　　W. W. SLOANE　　　　　2,454,484
SHAKER CONVEYER
Filed Oct. 4, 1945　　　　　　　　　　　　　　6 Sheets-Sheet 5
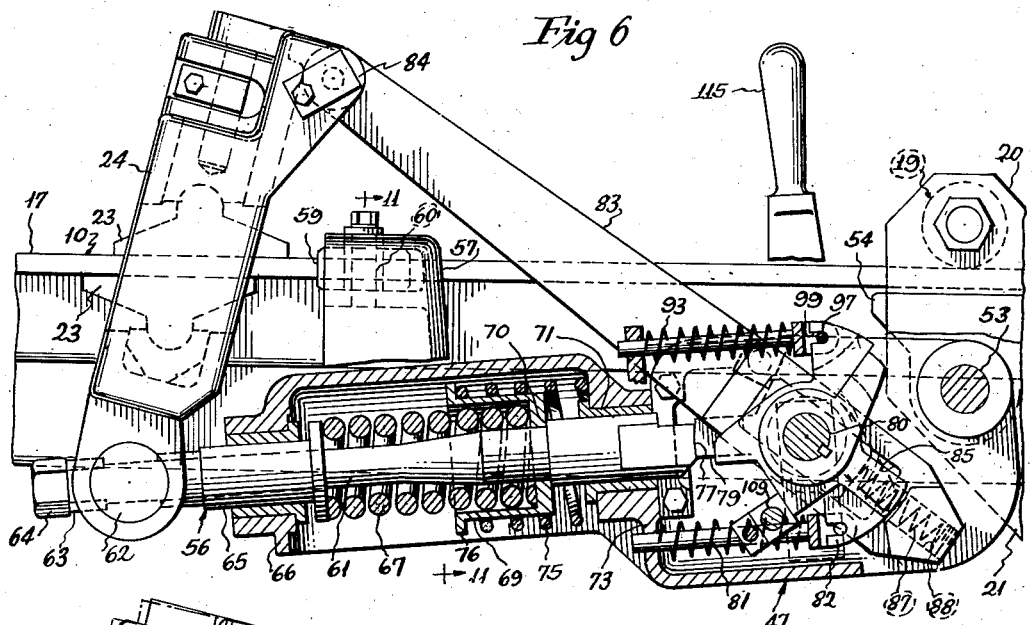
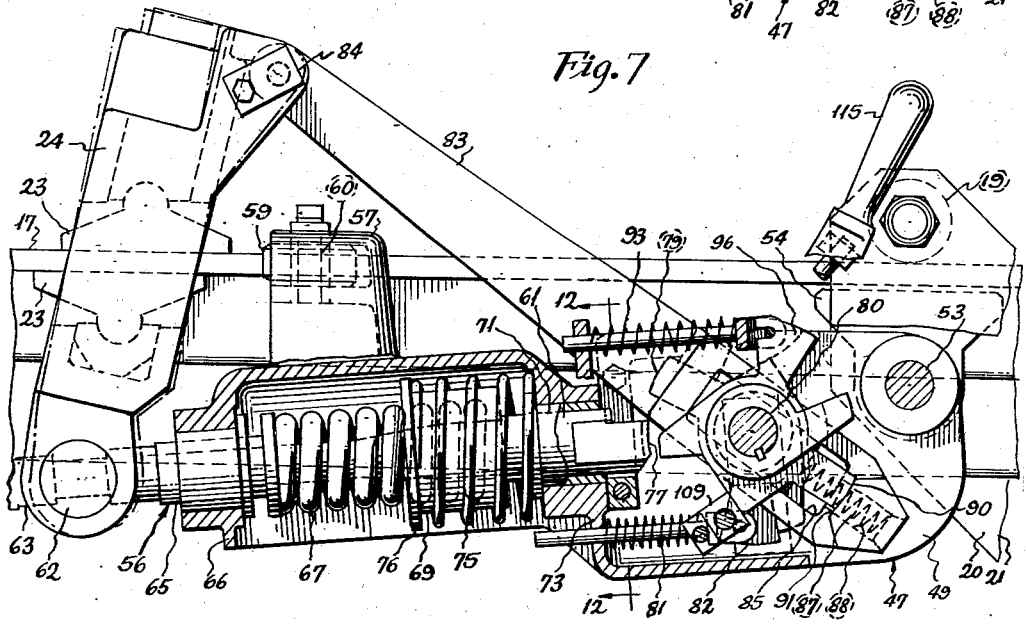
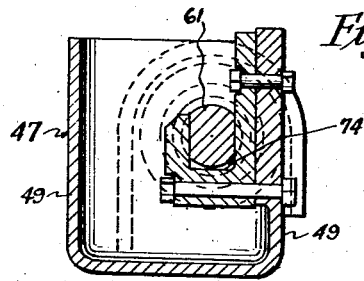
INVENTOR
William W. Sloane
Clarence F. Poole
ATTORNEY Nov. 23, 1948.　　　　　W. W. SLOANE　　　　　2,454,484
SHAKER CONVEYER
Filed Oct. 4, 1945　　　　　　　　　　　　　　6 Sheets-Sheet 6
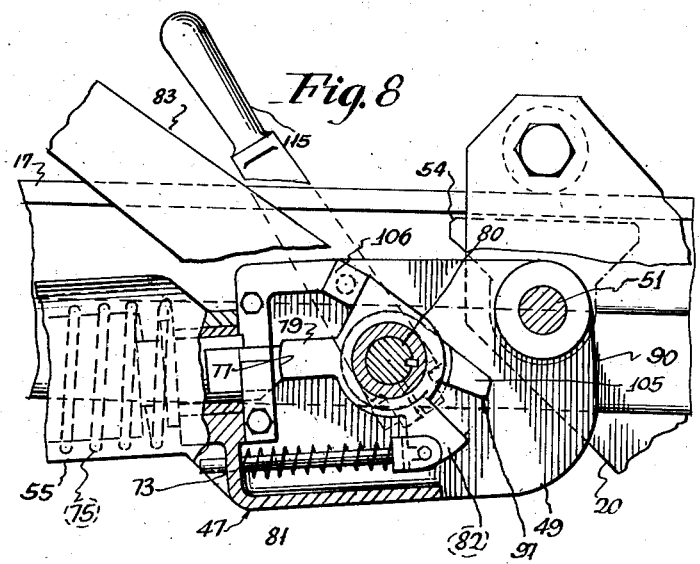
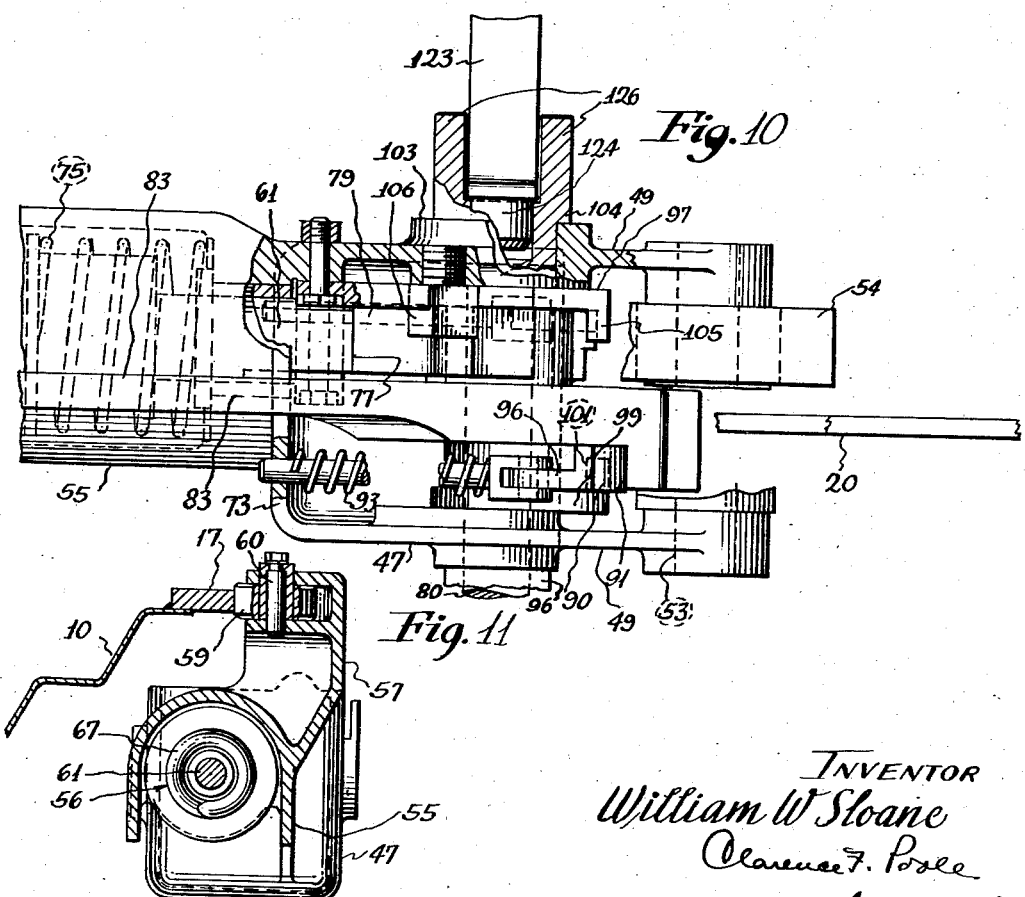
INVENTOR
William W. Sloane
Clarence F. Poole
ATTORNEY Patented Nov. 23, 1948

2,454,484

UNITED STATES PATENT OFFICE 2,454,484

SHAKER CONVEYER

William W. Sloane, Chicago, Ill., assignor to Goodman Manufacturing Company, Chicago, Ill., a corporation of Illinois Application October 4, 1945, Serial No. 620,362

11 Claims. (Cl. 198—220)

This invention relates to improvements in shaker conveyers and more particularly relates to an improved and simplified form of feeder head for automatically extending or retracting an extensible trough of a shaker conveyer with respect to the working face of a mine.

Extensible troughs for shaker conveyers have heretofore been automatically extended or retracted with respect to the working face of a mine by feeder heads operated by the action of the shaker conveyer, such as is shown in my Patent No. 2,318,808. These feeder heads are operated by a control lever which when placed in one position will cause the extensible trough to be extended with respect to a reciprocating trough of the conveyer, and when placed in another position will cause said trough to be retractibly moved with respect to said reciprocating trough. While such feeder heads are extremely efficient they have one disadvantage in that the control means for controlling extension and retraction of the extensible trough is under opposing loads for the entire forward and return strokes of the conveyer and is only relieved from these loads at the ends of the strokes of the conveyer. This control means therefore must be operated at the ends of the strokes of the conveyer in order to avoid the likelihood of breakage of parts of the feeder head and a back kick on the hand of the operator.

The principal object of my present invention is to remedy these difficulties by providing a novel and simplified form of feeder head, so arranged that the control handle for controlling extension or retraction of the extensible trough of the conveyer can be positioned in any desired operative position at any time during the stroke of the conveyer, or while the conveyer is not in operation, and the operating means for extending or retracting the conveyer will come into operation at the proper time, so as to prevent injury to the parts of the feeder head and eliminate back kick of the control handle, when said control handle is moved during operation of the conveyer.

In carrying out my invention, I provide the usual carrier members with their friction grip blocks and connect opposite ends of the carrier members to one of the troughs of the conveyer by means of links, which links are slidably movable with respect to the trough to which they are connected, but which may be held from movement to provide a reaction against one end or the other of the carrier member and to engage the grip blocks with their respective trough during alternate strokes of the conveyer, to extensibly or retractibly move the extensible trough of the conveyer. I also provide two holding cams for each carrier member, each of which holding cams is arranged to hold one of the links from movement, so either one of these links may be operative to feed the extensible trough of the conveyer, and mount these cams for free movement with respect to their control shaft so they will only be under load when holding their respective link from movement. I also positively hold these cams in a disengaged position by the control lever, but move them to an engaging position by yieldable means, upon movement of the control lever to the desired operative position.

These and other objects of my invention will appear from time to time as the following specification proceeds and with reference to the accompanying drawings wherein:

Figure 1 is a plan view of the inby end of a shaker conveyer trough line having a feeder head constructed in accordance with my invention embodied therein;

Figure 2 is an enlarged plan view of the inby end of the trough line with certain parts broken away and certain other parts shown in substantially horizontal section;

Figure 3 is an enlarged fragmentary view in side elevation with certain parts shown in longitudinal section in order to show certain details of the feeder head which are not shown in Figure 2;

Figure 4 is an enlarged transverse sectional view taken substantially along line 4—4 of Figure 2;

Figure 5 is an enlarged transverse sectional view taken substantially along line 5—5 of Figure 2;

Figure 6 is an enlarged fragmentary view in side elevation, showing the control lever for operating the feeding mechanism in a neutral position, and showing certain parts of the feeding mechanism in substantially longitudinal section;

Figure 7 is a view somewhat similar to Figure 6, but showing the control lever for operating the feeding mechanism in position to retract the extensible trough of the conveyer;

Figure 8 is an enlarged partial fragmentary view in side elevation, with certain parts shown in substantially longitudinal section, and showing the hand lever for controlling operation of the feeding mechanism in position to extend the extensible trough of the conveyer;

Figure 9 is an enlarged fragmentary view in substantially longitudinal section, showing certain details of the mounting for one of the control links of the feeding mechanism;

Figure 10 is an enlarged detail fragmentary plan view of a portion of the feeding mechanism, with certain parts thereof shown in substantially horizontal section;

Figure 11 is an enlarged fragmentary sectional view, taken substantially along line 11—11 of Figure 6;

Figure 12 is an enlarged fragmentary transverse sectional view taken substantially along line 12—12 of Figure 7;

Figure 13 is an enlarged fragmentary longitudinal sectional view taken substantially along line 13—13 of Figure 5; and Figure 14 is an enlarged exploded isometric view showing certain details of the holding cams and operating means therefor.

In the drawings, the embodiment of my invention illustrated therein includes generally an extensible trough 10 having a shovel 11 on its forward end, slidably supporting the forward end of said extensible trough on the ground, and adapted to pick up loose material from the ground. The rear end of said extensible trough is slidably supported above the ground on a ground-engaging shoe 13 by means of a pair of laterally spaced supporting legs 14, 14, extending upwardly from said shoe along the outer sides of a reciprocating trough 15 in a manner similar to that illustrated in a prior patent to Ernst R. Bergmann, Re. 21,027, and no part of my present invention. Said supporting legs are secured at their upper ends to the rear of bearing plates 17, 17, extending along the upper outer sides of said extensible trough. Said reciprocating trough is connected to and reciprocably driven from the shaker conveyer trough line through a swivel 16, which is so arranged as to permit the continuous flow of material along said reciprocating trough and swivel to the outby end of the trough line, when said reciprocating trough is in various positions of lateral displacement with respect to the trough line.

The bearing plates 17, 17 also form a supporting means for the forward end of the reciprocating trough 15 on rollers 19, 19. Said rollers are mounted on opposite upright sides 20, 20 of a supporting frame 21, secured to and extending across the bottom of and upwardly along opposite sides of the forward end of said reciprocating trough, beyond the upper limits thereof.

The bearing plates 17, 17 are also adapted to be engaged by friction grip blocks 23, 23 mounted in carrier members 24, 24 of a friction grip feeding device 25, for extensibly or retractibly moving said extensible trough with respect to said reciprocating trough, or for reciprocably moving said extensible and reciprocating troughs together. Said feeding device will hereinafter be more fully described as this specification proceeds. The reciprocating trough 15 is reciprocably mounted at its rear end on a base 26 of the swivel 16, which base is laterally slidable along the ground about the axis of connection of a swivel trough 27 of said swivel to a stationary base 28. Said swivel is similar to that shown and described in my Patent No. 2,360,169 which issued October 10, 1944, and is no part of my present invention so will not herein be shown or described in detail. Two arms 29, 29 are connected at their rear ends to said movable base and extend forwardly therefrom beneath the reciprocating trough 15, and are connected at their forward ends to a frame 30, which extends across the bottom of and has slidable bearing engagement with bearing members 31, 31 extending inwardly from opposite depending sides 33, 33 of the supporting frame 21, on the forward end of said reciprocating trough (see Figures 2 and 4). Said bearing members 31, 31 are each mounted on the inside of a transverse shaft 32, pivotally mounted in a side 33 of said support frame and have arcuate outwardly facing convex bearing surfaces. Said convex bearing surfaces of said bearing members are adapted to have engagement with outwardly facing concavely formed bearing guide members 34, 34, mounted on the outer sides of the frame 30 and extending longitudinally therealong.

The forward end of the frame 30 is interleaved by short upright arms 35, 35 projecting upwardly from the rear end of a floating frame 36. Said arms are pivotally connected at their upper ends to said frame 30 by means of a pivotal pin 37. Said floating frame extends in advance of said frame 30 and has floating engagement with the ground at its forward end. A horizontally disposed guide sheave 39 is mounted at each extreme forward outer side of said floating frame on a vertical pin 40. Said sheaves each have a flexible cable 41 trained therearound for feeding the shovel 11 about the swivel 16. Cable retaining covers 42, 42 are longitudinally pivoted adjacent the central part of said guide frame on pivotal pins 43, 43 and cover the tops of said guide sheaves and form a means for retaining the cables 41, 41 therein. The axis of pivotal connection of said floating frame to said frame 30 is so arranged with respect to the line of pull of said flexible cables and the guide sheaves 39, 39 that the reaction of said cables on said guide sheaves, when moving the extensible trough along the ground, will maintain the forward end of said floating frame in engagement with the ground and will keep said cables close to the ground out of the way of the men at the working face.

The flexible cables 41, 41 are trained rearwardly from said floating frame around and beyond the swivel 16, through and around suitable sheaves, to winding means indicated generally by reference character 44 mounted on a base 45, having floating engagement with the ground, and connected with the stationary base 28 of the swivel 16. Said winding means and the arrangement of said guide sheaves are not herein shown or described in detail since they are no part of my present invention.

Referring now to the details of the feeding device 25 and certain novel features of my invention, the carrier members 24, 24 and their friction grip blocks 23, 23 and the mechanism for operating said grip blocks are the same on each side of the conveyer, so need only be described in detail for one side of the conveyer. Said feeding device includes a connecting frame 47 pivotally connected to and extending forwardly from the forward end of an upright side wall 20 of the support frame 21, which support frame is secured to and extends forwardly from the forward end of the reciprocating trough 15. Said connecting frame has two laterally spaced rear side walls 49, 49 which extend along opposite sides of a shouldered sleeve 50, which is mounted in and secured to the side wall 20, and extends laterally beyond opposite sides thereof. A transversely extending pivotal pin 51 is journaled in said sleeve in a bearing 53 and extends through opposite side walls of said connecting frame and is secured thereto. The portion of said sleeve 50 extending inwardly from said side wall 20 forms a pivotal mounting for a bearing shoe 54 adapted to engage the underside of the bearing plate 17. Said bearing shoe with the roller 19 serves to prevent displacement of the reciprocating trough with respect to the extensible trough during extensible and retractible movement of said troughs with respect to each other.

The connecting frame 47 has a forwardly extending guide portion 55 forming a slidable guide for a yieldable link 56, pivotally connected to the lower end of the carrier member 24. An integrally formed support bracket 57 extends upwardly from said guide portion of said connecting frame, intermediate the ends thereof, and has a roller 59 mounted adjacent its upper end on a vertical pin 60. Said roller is adapted to engage the outer side of the bearing plate 17, to form a guide means for said connecting frame on said bearing plate (see Figure 11).

The yieldable link 56 includes a shaft 61, slidably mounted in a transversely extending pivotal pin 62, pivotally mounted in the lower end of the carrier member 24 (see Figure 6). A collar 63 is slidably mounted on said shaft and abuts the advance side of the pin 62. A nut 64 threaded on the end of said shaft serves to retain said shaft on said pin and also forms a means for adjusting the length of said yieldable link. A flanged sleeve 65 is slidably mounted on said shaft, on the opposite side of said pin from said collar, and abuts the rear side of said pin. Said sleeve is slidably mounted in a forward end wall 66 of the guide portion 55 of the connecting frame 47, and the flange of said sleeve is disposed on the rear or inside of said end wall. A compression spring 67 encircles said shaft and is interposed between the flange of said flanged sleeve and a cup-shaped retaining member 69, within which said spring is seated. Said retaining member abuts a shouldered portion 70 of said shaft and is suitably secured to said shaft, as by welding (see Figure 6). Said spring is of such strength that said yieldable link normally acts as a solid member, and only yields to release said grip blocks from said bearing plate upon extreme overload conditions. The inner end of said shaft is slidably mounted in a bearing sleeve 71, mounted in an inner end wall 73 of said guide portion of said connecting frame. Said shaft extends through said inner end wall and its opposite sides are flattened and have slidable engagement with opposite sides of a channeled guide 74, secured to an inner side wall 49 of said connecting frame (see Figure 12).

A spring 75 encircles the retaining member 69 and abuts a flanged portion 76 of said retaining member at its forward end. The opposite end of said spring abuts the forward end of the inner end wall 73 of the connecting frame 47. Said spring serves to urge the yieldable link 56 in a forward direction with respect to the guide portion 55 of the connecting frame 47, to position the carrier member 24 to engage the grip blocks 23, 23 with the bearing plate 17 at the ends of the return strokes of the conveyer, to assure gripping of said grip blocks on said bearing plate for the entire length of the forward strokes of the conveyer.

The shaft 61 extends rearwardly beyond the guide 74 and has a slightly concave arcuate engaging end portion 77, which is adapted to be engaged by a holding cam 79. Said holding cam is mounted coaxially of a transverse shaft 80, for free movement with respect thereto and is operable to hold said shaft from rectilinear movement with respect to the connecting frame 47.

This will cause a force to be exerted from the reciprocating trough 15 through the yieldable link 56 against the lower end of the carrier member 24, during the forward strokes of the conveyer, in a direction to engage the grip blocks 23, 23 with the bearing plate 17, and will exert a force against the lower end of said carrier member in an opposite direction during the return strokes of the conveyer to release said grip blocks from said bearing plate, and will cause said grip blocks to extend the extensible trough 10.

A spring pressed plunger 81 is provided to move the holding cam 79 to a position where it will drop into engagement with the engaging end portion of the shaft 61, to hold said shaft from rectilinear movement with respect to said connecting frame. Said plunger is slidably mounted in the inner end wall 73 of the connecting frame 47, adjacent the lower end thereof, and is operatively connected with a depending radial wing 82 of said holding cam, for urging said cam to move in a counterclockwise direction. A slight clearance is provided between the end of said holding cam and said engaging surface, to permit said cam to be readily moved into engagement with said link by said plunger, at the return strokes of the conveyer.

A link 83 extends rearwardly and angularly downwardly from, and is pivotally connected to a rearwardly extending bifurcated ear 84, at the upper end of the carrier member 24. Said link has a longitudinally extending slot 85 formed in its lower end, which is slidably mounted on a block 86, pivotally mounted on the transverse shaft 80 (see Figure 9). A spring 87 is seated within a drilled lower portion 88 of said link and is interposed between the lower end of said link and the underside of the block 86. Said spring tends to hold said block in engagement with the extreme upper end of said slot, to urge said carrier member to a position to engage the friction grip blocks 23, 23 with the bearing plate 17 at the extreme ends of the forward strokes of the conveyer, to assure that said blocks will grip said bearing plate for the entire length of the return strokes of the conveyer, during retractible movement of the extensible trough 10.

A holding cam 90, freely mounted on the transverse shaft 80 is adapted to engage an upwardly facing engaging surface 91, formed on the outer side of the lower portion of the link 83, to positively hold said link from slidable movement with respect to said shaft, along the block 86. A slight clearance is provided between the end of said cam and said engaging surface at the forward strokes of the conveyer, to permit said cam to readily be moved into engaging position with said link. When said link is held from slidable movement with respect to said shaft, it will exert a force on the upper end of the carrier member 24, in a direction to engage the grip blocks 23, 23 with the bearing plate 17 on the return strokes of the conveyer, and to disengage said grip blocks from said bearing plate upon the forward strokes of the conveyer, to retractibly move said extensible trough with respect to said reciprocating trough.

The cam 90 is moved to a position to drop into engagement with the engaging surface 91 upon a forward stroke of the conveyer, to hold said link from movement along the block 86 and cause the grip blocks 23, 23 to grip the bearing plate 17, during the return strokes of the conveyer, by means of a spring pressed plunger 93. Said plunger is slidably mounted in the inner end wall 73 of said connecting frame, adjacent the upper end thereof, and has operative connection with a radial wing 96 of said cam.

The holding cams 79 and 90 are positively moved out of holding engagement with their respective links 56 and 83, or are released to permit the respective spring pressed plungers 81 and 93 to move said cams to holding positions, by means of individual engaging members 97 and 99, respectively, keyed on the transverse shaft 80 (see Figure 5).

The engaging member 97 has the holding cam 79 freely mounted thereon. Said engaging member has a flanged portion extending along the inner side of a bearing boss 103 formed integrally with the inner side wall 49 of the connecting frame 47, and forming a bearing support for an enlarged inner end 104 of the shaft 80. Said engaging member also has an engaging end 105 extending outwardly from the flanged portion thereof and adapted to engage the side of the wing 82 of said holding cam, opposite from the point of connection of the spring pressed plunger 81 thereto. When said engaging member is moved in a counterclockwise direction from the position shown in Figure 6 to the position shown in Figure 8, its engaging end is moved away from said wing 82, to permit the spring pressed plunger 81 to move said holding cam into position to engage the engaging end 77 of the shaft 61 of the yieldable link 56, upon a return stroke of the conveyer. When said engaging member is positively moved in an opposite direction, said engaging member will move freely until it comes into engagement with the wing 82, when it will positively disengage said holding cam from said engaging end of said shaft. It should here be noted that clearance is provided between said engaging member and said wing, to permit said plunger to move said cam into engagement with said engaging end 77 of said shaft 61 when the control handle for the shaft 80 is in the neutral position shown in Figure 6 and the forwardly extended position shown in Figure 8. A rectangular stop 106, threaded in and extending inwardly from the inside of the inner side wall 49, is adapted to be engaged by opposed angular faces of said cam, to limit movement of said holding cam to either an engaged or disengaged position.

The engaging member 99 is journaled on its hub in a bearing boss 100 formed in the outer side wall 49 of the connecting frame 47, and has a radially extending engaging end 101 extending inwardly from said side wall and having engagement with the side of the radial wing 96 of the cam 90 opposite from the plunger 93 (see Figure 5). Pivotal movement of the shaft 80 in a direction which in Figure 6 is a clockwise direction, from the position shown in Figure 6 to the position shown in Figure 7, will move said engaging end of said engaging member away from said wing 96, to permit the spring pressed plunger 93 to move the holding cam 90 in the same direction in position to drop into engagement with the engaging surface 91 of the link 83 upon a forward stroke of the conveyer, while movement of said engaging member in an opposite direction from the position shown in Figure 6 to that shown in Figure 7, will positively release said holding cam from said engaging surface 91. A rectangular stop 109 is herein shown as being threaded in the inside of the outer end wall 49 and is adapted to be engaged by opposed angular faces of said holding cam 90, to limit movement of said cam into an engaged or disengaged position.

A hand lever 115 is mounted on the outer end of the transverse shaft 80, for operating said shaft. Said hand lever is held in any one of its operative positions by means of a spring 116 encircling a rod 117. Said rod is transversely pivoted between the furcations of a bifurcated ear 118, extending upwardly from the connecting frame 47, on a pivotal pin 119, the center of which pin is in vertical alignment with the center of the shaft 80. The opposite end of said shaft is slidably mounted in a guide member 120, threaded in said hand lever 115 and pivotally movable with respect thereto about a transverse axis. Said spring 116 is interposed between the underside of said guide member and a collar 122 adjacent the lower end of said rod. Thus when said hand lever is in one position or the other beyond a dead center position, said compression spring will tend to urge said hand lever in the direction to which it is being turned, and will prevent said hand lever from being moved back to a neutral position by reciprocable movement of the conveyer.

The transverse shafts 80, 80 on opposite sides of the conveyer are connected to operate together by means of a transversely extending connecting member 123 (see Figure 5). Said connecting member has opposite cylindrical ends 124, 124 adapted to fit within drilled end portions of the enlarged inner ends 104, 104 of the shafts 80, 80. Said connecting member conforms generally to the form of the conveyer trough and extends downwardly from its ends and beneath and across the bottom of said trough. The downwardly extending portions of said connecting member are of a substantially rectangular formation and extend between parallel spaced wall portions 126, 126 extending inwardly from and herein shown as being formed integrally with the enlarged ends of said shafts 80, 80.

When the hand levers 115 are in the upright or neutral position shown in Figure 6, the engaging ends of the engaging members 97 and 99 will be moved away from the respective holding cams 79 and 90 and the spring pressed plungers 81 and 93 will move their respective holding cams in directions to engage the engaging surfaces 77 and 91 of the respective links 56 and 83 at the ends of the forward or return strokes of the conveyer. When said holding cams are in engagement with said engaging surfaces, the links 56 and 83 will engage the grip blocks 23 with the bearing plates 17 during the forward and return strokes of the conveyer, to reciprocably move the extensible trough 10 with the reciprocating trough 15.

When the hand levers 115 are in the rearwardly inclined position shown in Figure 7, the engaging ends of the engaging members 97 will hold the cams 79 out of engagement with the engaging ends 77 of the yieldable links 56, to permit a limited amount of movement of said yieldable links with respect to the connecting frames 47. The engaging ends of the engaging members 99 will be moved away from the cams 90 to permit the spring pressed plungers 93 to move said cams in directions to engage the engaging surfaces 91 of the links 83, it being understood that said cams will drop into engagement with said engaging surfaces as the conveyer starts its forward stroke. When said cams are in engagement with said engaging surfaces, said links will be positively held from slidable movement with respect to the shafts 80. This will exert a force on the upper ends of the carrier members 24 during the return strokes of the conveyer to engage the friction grip blocks 23 with the bearing plates 17 during the return strokes of the conveyer, and to be released from said bearing plates during the forward strokes of the conveyer, to retractibly move the extensible trough 10 with respect to the reciprocating trough 15.

When the hand levers 115 are in the forwardly inclined position shown in Figure 9, the engaging ends of the engaging members 99 will be positively engaged with the wings 96 of the cams 90, and said enaging members will hold said cams out of engagement with the engaging surfaces 91 of the links 83. The engaging ends of the engaging members 97 will also be moved away from the wings 82 of the holding cams 79 to permit the spring pressed plungers 81 to move said holding cams into position to drop into engagement with the engaging ends 77 of the yieldable links 56 at the end of a return stroke of the conveyer. This will cause said yieldable links to exert a force on said carrier members during the forward strokes of the conveyer to engage the grip blocks 23 with the bearing plates 17, and exert a force on the lower ends of said carrier members in an opposite direction to disengage said grip blocks from said bearing plates during the return strokes of the conveyer, to extensibly move said extensible trough with respect to said reciprocating trough.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a feeding mechanism for shaker conveyers, two reciprocating troughs, one of which is extensible with respect to the other, a carrier member, a link connecting one end of said carrier member with one of said troughs, friction grip means mounted on said carrier member for engagement with the other of said toughs, a transverse shaft, said link being rectilinearly movable with respect to said shaft, a hand lever for operating said shaft, a holding cam freely mounted on said shaft and adapted to engage said link and hold it from rectilinear movement with respect to said shaft, and yieldable means adapted to move said holding cam into position to drop into engagement with and to hold said link from rectilinear movement with respect to said shaft, upon reversal of movement of the conveyer and the positioning of said hand lever in the desired operative position, to cause said link to exert a force on said carrier member in a direction to grip said grip blocks with their respective trough during alternate strokes of the conveyer and move one of said troughs with respect to the other of said troughs.

2. In a feeding mechanism for shaker conveyers, two reciprocating troughs, one of which is extensible with respect to the other, a carrier member, a link connecting one end of said carrier member with one of said troughs, friction grip means mounted on said carrier member for engagement with the other of said troughs, a transverse shaft, said link being rectilinearly movable with respect to said shaft, a hand lever for operating said shaft, a holding cam freely mounted on said shaft, yieldable means adapted to move said holding cam into position to drop into holding engagement with said link upon reversal of movement of the conveyer and the positioning of said hand lever in the desired operative position, to cause said link to exert a force on said carrier member to engage said grip blocks with one of said troughs during alternate strokes of the conveyer and extensibly or retractibly move one of said troughs with respect to the other of said troughs, and an engaging member operated by said hand lever for positively releasing said holding cam from holding engagement with its associated link and for holding said cam in a released position.

3. In a feeding mechanism for shaker conveyers, two reciprocating troughs, one of which is extensible with respect to the other, a carrier member, a link connecting one end of said carrier member with one of said troughs, friction grip means mounted on said carrier member for engagement with the other of said troughs, a transverse shaft, a hand lever for operating said shaft, said link being rectilinearly movable with respect to said shaft, a spring connected with said link, for urging said link to move in a direction to position said carrier member to engage said grip blocks with their respective trough, a holding cam freely mounted on said shaft and adapted to engage said link, to hold said link from rectilinear movement with respect to said shaft, to cause said link to exert a force on said carrier member to engage said grip blocks with their respective trough during alternate strokes of the conveyer, and yieldable means operatively connected with said holding cam, for moving said cam to a position to drop into holding engagement with said link upon reversal of movement of the conveyer and the positioning of said hand lever in the desired operative position.

4. In a feeding mechanism for shaker conveyers, two reciprocating troughs, one of which is extensible with respect to the other, a carrier member, a link connecting one end of said carrier member with one of said troughs, friction grip means mounted on said carrier member for engagement with the other of said troughs, a transverse shaft, a hand lever for operating said shaft, said link being rectilinearly movable with respect to said shaft, a spring connected with said link, for urging said link to move in a direction to position said carrier member to engage said grip blocks with their respective trough, a holding cam freely mounted on said shaft and adapted to engage said link, to hold said link from rectilinear movement with respect to said shaft, to cause said link to exert a force on said carrier member to engage said grip blocks with their respective trough during alternate strokes of the conveyer, an engaging member on said shaft for holding said cam in a released position with respect to said link and for moving said cam to such a position, and yieldable means operatively connected with said cam and acting against said engaging member for moving said cam to a position to drop into holding engagement with said link upon reversal of movement of the conveyer and upon movement of said engaging member out of engagement with said holding means.

5. In a feeding mechanism for shaker conveyers, two reciprocating troughs, one of which is extensible with respect to the other, a carrier member, friction gripping means mounted in said carrier member for engagement with one of said troughs, a frame pivotally mounted on the other of said troughs for movement with respect thereto about a transverse axis, a shaft pivotally mounted in said frame and extending transversely thereof, a link connected with one end of said carrier member and mounted for slidable movement with respect to said shaft, a holding cam freely mounted on said shaft and adapted to be moved into engagement with said link to hold said link from rectilinear movement with respect to said shaft, an engaging member on said shaft selectively operable to engage said holding cam and hold said cam out of engagement with said link and to positively disengage said cam from said link, yieldable means operatively connected with said cam and operable to move said cam into position to engage said link upon reversal of movement of the conveyer and upon movement of said engaging member to the desired position, to hold said link from slidable movement with respect to said shaft, to cause said link to exert a force on said carrier member to move said grip blocks to grip one of said troughs during alternate strokes of the conveyer and move one of said troughs with respect to the other in one direction, and a single stop adapted to be engaged by said cam for limiting movement of said cam into a holding or released position.

6. In a feeding mechanism for shaker conveyers, two reciprocating troughs, one of which is extensible with respect to the other, a carrier member, a link connecting one end of said carrier member with one of said troughs, a link connecting the opposite end of said carrier member with said one trough, said links being slidably movable with respect to said trough, friction grip blocks mounted in said carrier member for engagement with the other of said troughs, a transverse shaft, a separate holding means for each link freely mounted on said shaft and selectively operable to hold either one or both of said links from movement with respect to said one trough to cause either one or both of said links to exert a force on said carrier member during alternate strokes of the conveyer to engage said friction grip blocks with their respective trough and to extensibly or retractibly move one of said troughs with respect to the other, or to reciprocably move said troughs together, a control lever, and separate yieldable means connected to each holding means for moving said associated holding means to a position to drop into holding engagement with an associated link upon reversal of movement of the conveyer and upon movement of said control lever to the desired operative position.

7. In a feeding mechanism for shaker conveyers, two reciprocating troughs, one of which is extensible with respect to the other, a carrier member, a link connecting one end of said carrier member with one of said troughs, a link connecting the opposite end of said carrier member with said one trough, said links being slidably movable with respect to said trough, friction grip blocks mounted in said carrier member for engagement with the other of said troughs, a transverse shaft, and two holding cams freely mounted on said shaft for holding either one or both of said links from slidable movement with respect to said shaft, to extensibly or retractibly move one of said troughs with respect to the other trough, or to reciprocably move said troughs together, a control lever for turning said shaft, means for holding said cams out of holding engagement with their respective links and for positively disengaging said cams from said links, and individual yieldable means for each holding cam, for moving said holding cams to a position to drop into engagement with an associated link upon reversal of movement of the conveyer and upon movement of said control lever to the desired operative position.

8. In a feeding mechanism for shaker conveyers, two reciprocating troughs, one of which is extensible with respect to the other, a carrier member, a link connecting one end of said carrier member with one of said troughs, a link connecting the opposite end of said carrier member with said one trough, said links being slidably movable with respect to said trough, friction grip blocks mounted in said carrier member for engagement with the other of said troughs, a transverse shaft, holding means freely mounted on said shaft and selectively operable to hold either one or both of said links from movement with respect to said one trough to extensibly or retractibly move one of said troughs with respect to the other trough, engaging means on said shaft for moving said holding means to a released position and for holding said holding means in such a position, yieldable means reacting in a direction against said holding means, for moving said holding means to positions to drop into engagement with an associated link upon reversal of movement of the conveyer and upon movement of said engaging means out of engagement with said holding means, and a single stop for each cam for limiting movement of an associated cam into a holding or released position.

9. In a feeding mechanism for shaker conveyers, a reciprocating trough, an extensible trough mounted for extensible or retractible movement with respect to said reciprocating trough, a carrier member, friction gripping means mounted in said carrier member for engagement with said extensible trough to cause extensible or retractible movement of said trough upon reciprocable movement of said reciprocating trough, a frame pivotally mounted on said reciprocating trough for movement with respect thereto about a transverse axis, a transverse shaft pivotally mounted in said frame, a link pivotally connected with one end of said carrier member and mounted on said shaft for slidable movement with respect thereto, a link pivotally connected to the opposite end of said carrier member and mounted in said frame for slidable movement with respect thereto, the extended longitudinal center of said last mentioned link intersecting the center of said shaft and said link being adapted to yield when said extensible trough engages an obstruction on the ground during the forward strokes of the conveyer, to release said gripping means, two holding cams freely mounted on said shaft for holding either or both of said links from slidable movement with respect to said shaft, to cause said link held from movement to exert a force on said carrier member in a direction to engage said grip blocks with said extensible trough during alternate strokes of the conveyer, to extensibly or retractibly move said extensible trough with respect to said reciprocating trough or to cause both of said troughs to reciprocably move together, a hand lever for operating said shaft, and separate yieldable means connected with each of said holding cams and selectively operable to move said respective holding cam into position to drop into holding engagement with an associated link upon reversal of movement of the conveyer and the positioning of said hand lever in the desired operative position.

10. In a feeding mechanism for shaker conveyers, a reciprocating trough, an extensible trough mounted for extensible or retractible movement with respect to said reciprocating trough, a carrier member, friction gripping means mounted in said carrier member for engagement with said extensible trough to cause extensible or retractible movement of said trough upon reciprocable movement of said reciprocating trough, a frame pivotally mounted on said reciprocating trough for movement with respect thereto about a transverse axis, a transverse shaft pivotally mounted in said frame, a link pivotally connected with one end of said carrier member and mounted on said shaft for slidable movement with respect thereto, a link pivotally connected to the opposite end of said carrier member and mounted in said frame for slidable movement with respect thereto, the extended longitudinal center of said last mentioned link intersecting the center of said shaft and said link being adapted to yield when said extensible trough engages an obstruction on the ground during the forward strokes of the conveyer, to release said gripping means, two holding cams freely mounted on said shaft for holding either or both of said links from slidable movement with respect to said shaft, to cause said link held from movement to exert a force on said carrier member in a direction to engage said grip blocks with said extensible trough during alternate strokes of the conveyer, to extensibly or retractibly move said extensible trough with respect to said reciprocating trough or to cause both of said troughs to reciprocably move together, a hand lever for operating said shaft, separate yieldable means connected with each of said holding cams and selectively operable to move said respective holding cam into position to drop into holding engagement with an associated link upon reversal of movement of the conveyer and the positioning of said hand lever in the desired operative position, and a separate engaging member on said shaft for each of said cams operative to positively move an associated cam out of holding engagement with its respective link, and to hold said cam in a disengaged position with respect to its respective link.

11. In a feeding mechanism for shaker conveyers, a reciprocating trough, an extensible trough mounted for extensible or retractible movement with respect to said reciprocating trough, a carrier member, friction gripping means mounted in said carrier member for engagement with said extensible trough to cause extensible or retractible movement of said trough upon reciprocable movement of said reciprocating trough, a frame pivotally mounted on said reciprocating trough for movement with respect thereto about a transverse axis, a transverse shaft pivotally mounted in said frame, a link pivotally connected with one end of said carrier member and mounted on said shaft for slidable movement with respect thereto, a link pivotally connected to the opposite end of said carrier member and mounted in said frame for slidable movement with respect thereto, the extended longitudinal center of said last mentioned link intersecting the center of said shaft and said link being adapted to yield when said extensible trough engages an obstruction on the ground during the forward strokes of the conveyer, to release said gripping means, two holding cams freely mounted on said shaft for holding either or both of said links from slidable movement with respect to said shaft, to cause said link held from movement to exert a force on said carrier member in a direction to engage said grip blocks with said extensible trough during alternate strokes of the conveyer, to extensibly or retractibly move said extensible trough with respect to said reciprocating trough or to cause both of said troughs to reciprocably move together, a hand lever for operating said shaft, means for holding said cams out of engagement with their respective links and for positively disengaging said cams from said links, separate yieldable means connected with each of said holding cams and selectively operable to move said respective holding cam into position to drop into holding engagement with an associated link upon reversal of movement of the conveyer and the positioning of said hand lever in the desired operative position, and a single stop for each of said cams for limiting movement of an associated cam into a holding or released position.

WILLIAM W. SLOANE.

REFERENCES CITED

The following references are of record in the file of this patent:

UNITED STATES PATENTS

| Number | Name | Date |
|---|---|---|
| 2,318,808 | Sloane | May 11, 1943 |